United States Patent [19]

Schluenz

[11] Patent Number: 4,482,688

[45] Date of Patent: Nov. 13, 1984

[54] LIGHT-COLORED HYDROCARBON AND TERPENE RESINS DECOLORIZED BY IODINE COMPOUNDS

[75] Inventor: Robert W. Schluenz, Panama City, Fla.

[73] Assignee: Arizona Chemical Company, Fair Lawn, N.J.

[21] Appl. No.: 383,438

[22] Filed: Jun. 1, 1982

[51] Int. Cl.$^3$ ............................ C08F 36/00; C08F 6/00
[52] U.S. Cl. .................................... 526/237; 528/480
[58] Field of Search ..................... 526/237; 528/480; 252/106

[56] References Cited

U.S. PATENT DOCUMENTS

| | | | |
|---|---|---|---|
| 530,303 | 3/1876 | Diessel et al. | 252/106 |
| 2,518,573 | 8/1950 | Scott | 526/206 |
| 2,647,107 | 7/1953 | Barnes | 526/206 |
| 3,600,366 | 8/1971 | Heckert | 528/480 |
| 3,671,630 | 6/1972 | Carroll et al. | 252/106 |
| 4,107,420 | 8/1978 | Schluenz et al. | 526/237 |
| 4,131,556 | 12/1978 | Klopotek et al. | 252/106 |
| 4,222,954 | 9/1980 | Cuscurido et al. | 252/106 |

FOREIGN PATENT DOCUMENTS 1770616 12/1979 Fed. Rep. of Germany ...... 526/237

*Primary Examiner*—Joseph L. Schofer
*Assistant Examiner*—Peter F. Kulkosky
*Attorney, Agent, or Firm*—Gordon L. Hart

[57] ABSTRACT

Resins prepared by cationic polymerization of pure or combined feeds of $C_5$–$C_{10}$ hydrocarbons are decolorized by use of iodine or bromine or their compounds. Activation by heat or radiation is usual. The decolorizing agents may be added prior to or during the polymerization process or to the polymerized resin before or after isolation.

5 Claims, No Drawings

LIGHT-COLORED HYDROCARBON AND TERPENE RESINS DECOLORIZED BY IODINE COMPOUNDS

The invention relates to improvements in hydrocarbon resins which are prepared by cationic polymerization. More particularly the invention provides a method for improving the color of such resins by use of a decolorizing agent. This system works particularly well with polyterpene resins.

The class of resins to which the invention can be applied comprises polymers of cyclic and acylic hydrocarbon monomers having five to ten carbon atoms ($C_5$-$C_{10}$) and having one or two ethylenic double bonds. In addition to the terpenes, the class includes other $C_5$-$C_{10}$ hydrocarbon monomers such as piperylene, dicyclopentadiene, 2-methyl-butene-2, isoprene, styrene, $\alpha$-methylstyrene, and the like. The resins include homopolymers and copolymers of the terpenes, e.g. $\alpha$- and $\beta$-pinenes, limonene and the like copolymers of terpenes with the other $C_5$-$C_{10}$ unsaturated hydrocarbon monomers and, to a less preferred extent, also polymers made from only the non-terpene $C_5$ to $C_{10}$ hydrocarbon monomers. All of these resins are prepared by cationic polymerization. A preferred polymerization catalyst is $AlCl_3$ which may be used alone or in combination with $H_3PO_4$, $SiCl_4$, alkyl silicon halides, alkyl germanium halides, antimony trichloride and the like. Other suitable catalysts for the cationic polymerization include $BF_3$ and ferric chloride.

These resins are conveniently prepared by polymerization of the monomers with the polymerization catalyst in organic solvent. When the polymerization is finished, the reaction mixture is quenched and the catalyst and water-soluble byproducts are washed from the organic product solution with water. The solvent is then distilled from the solution. Several methods for making such resins are described for example in U.S. Pat. Nos.

| | |
|---|---|
| 4,098,982 | 4,011,385 |
| 4,057,682 | 3,852,218 |
| 4,052,549 | 3,761,457 |
| 4,016,346 | 3,737,418 |

According to the invention, polyterpene resins and related hydrocarbon resins of the kind described are improved in color by addition of a small proportion of iodine or bromine, added as elemental iodine or bromine or as a compound of iodine or bromine. Iodine is more active than bromine and is the preferred decolorizing agent. Iodine or bromine may be added to the reaction mixture before or during the polymerization reaction, or it may be added to a solution of the polymerized resin, or to a liquid melt of the resin after the solvent has been removed. At an elevated temperature, usually about 130° C. to 200° C., the added agent will cause a reduction in color of the resin.

Many uses for polyterpene and related hydrocarbon resins require that the resin be as near colorless as possible. An example is the use of those resins in solvent based and hot melt coatings and adhesives. Decolorizing the resins to Gardner color of 1 or less makes them suitable for use in visible coatings and adhesives where color and clarity are important.

Another method of decolorizing hydrocarbon resins is by catalytic hydrogenation. This technique is expensive since it requires the use of high pressure equipment, noble metal catalysts and hydrogen. The present decolorizing treatment is simple and inexpensive. A further advantage of this treatment is that the adhesive properties, unlike the case with hydrogenation, remain the same since the molecular structure and polarity are unchanged by the decolorizing treatment.

Iodine is most conveniently added in its elemental crystalline solid form which readily dissolves in the organic solvents or in the molten resins. It may be dissolved first and added as a solution if desired. An effective amount of iodine in the monomer or polymer will usually be less than one percent by weight, preferably in the range about 0.01 to 0.2% by weight based on the monomer or resin weight. The decolorizing effect is evident through the range from very low addition levels (5-10 ppm) to very high levels. However, the practical range for this purpose usually lies between 0.005 to 0.2%. When iodine or bromine compounds are used, the effective amounts will be about the same as those described for iodine or bromine.

The degree of color reduction obtained by use of a selected decolorizing agent of this class will vary from one resin to another. The agents are most effective in resins having the highest proportions of polymerized terpene units and will be less effective for decolorizing some of the normally dark polymers that are made from only non-terpene hydrocarbon monomers of the class described.

The amount of iodine required for maximum decolorization may vary from one resin to another, and from one method of resin preparation to another. Generally, some improvements of color is seen at proportions of $I_2$ as low as 0.005%. The decolorization increases as the $I_2$ proportion is increased, up to a maximum at about 0.2%. Little improvement of color has been seen when $I_2$ concentrations are further increased beyond about 0.2%. Furthermore, the effective amount of iodine for a given resin is about the same regardless of the selected mode of addition, i.e. by addition to the monomer or addition to the resin solution or addition to the neat molten resin.

The exact mechanism of resin decolorization by iodine has not been determined. Elemental iodine may be introduced, as indicated above, or the iodine may be introduced by use of iodine compounds. For example, during the polymerization a small percent of the cationic catalyst can be replaced with aluminum iodide. Small amounts of hydrogen iodide or other inorganic iodides, for example, sodium iodide, potassium iodide, ferrous iodide, etc., may be added to the polymerization mixture.

Other alternative iodine sources may also be used to decolorize this class of resins. For example, iodoform, iodine monochloride, ammonium iodide, potassium iodate, iodic acid and higher alkyl iodides etc.

The decolorization is activated by heat generally at about 130°-200° C. and is effective at temperatures up to about 240° C. or higher. Since all of the resin solutions were heated to about 240° C. to remove the solvent, the exact lower temperature at which the decolorization occurs was not always determined. The decolorization occurs rapidly as the effective temperature is reached and then remains constant. For example, as a resin solution was heated to distill the solvent, decolorization occurred at about 130°-200° C. in most cases. The color then remained constant as the temperature was increased to 230° C. and held for an additional 4 hours at 230° C. The decolorization by iodine can also be activated by ultraviolet radiation. Thus the resin can be decolorized by irradiation at lower temperatures.

The invention is illustrated by reference to specific, detailed examples which follow including our presently most preferred mode for carrying out the invention.

EXAMPLE I

Iodine added to Monomer

A reaction vessel is equipped with a stirrer, a gas inlet, addition funnels, catalyst feeder, overflow tube and thermometer. Into the vessel is placed 80 g dry p-xylene solvent. The reactor is blanketed with nitrogen. A mixture of alpha-pinene monomer with 0.02 percent by wt iodine dissolved therein is prepared. Four grams of $AlCl_3$ is added to the reactor and one hundred grams of the monomer-iodine mixture is metered into the slurry gradually over a period of 15 minutes, while maintaining the temperature at 40° C. This fills the reactor to the overflow tube. The continuous phase of the polymerization is then carried out by simultaneous proportionate metering to the reactor of the following: (a) solution of 500 g of the monomer-iodine mixture in 200 g dry p-xylene and (b) 20 g of solid $AlCl_3$, over a period of 90 minutes. Shortly after this addition is started, the reactor begins to overflow into a secondary reactor vessel. After all of the monomer solution has been added, the reactor contents are transferred to the secondary vessel which is maintained at 45° C. for one hour. The catalyst is then quenched by addition of 500 ml of water to the secondary vessel. The organic phase is washed twice with warm water to remove the catalyst remnants. The separated organic phase is heated very slowly to 240° C. to evaporate the solvent from the resin product. Color of the resin product made with the alpha-pinene-iodine mixture is Gardner 1. For comparison, a resin product made in the same way except without iodine has a color of Gardner 3.

EXAMPLE 2

Addition to Resin Solution

To 500 milliliters of p-xylene, there were added 18 grams of anhydrous aluminum chloride. The mixture was stirred and provisions for external cooling were made. Addition of 600 grams of a monomer mixture consisting of 86% β-pinene and 14% dipentene was begun. When the reaction temperature reached 45° C., external cooling was initiated and further monomer additions were at a rate such that the temperature remained at 45° C. Approximately one hour was required to complete monomer addition. After monomer addition was complete, the reaction mixture was maintained at 45° C. for an additional 30 minutes. The aluminum chloride was then removed by washing the xylene solution with 2% aqueous hydrochloric acid followed by deionized water washes until the wash water was neutral. The xylene was then removed by vacuum distillation. Yield of copolymer was 97%. The ball and ring softening point (*ASTM method E28-58T) was 122° C. The Gardner color was 3+.

The above procedure was repeated except that 0.02% of $I_2$ was added to the resin solution prior to solvent removal. Solvent was removed by distillation under vacuum. The temperature of the molten resin prior to cooling and packaging was 240° C. The softening point and yield values were equivalent to the material of the previous experiment. The color of the neat resin was Gardner 1—, APHA color 75.

The above procedure was repeated except that 0.2% of bromine was added to the resin solution. On removal of solvent the color of the resin was Gardner 2—.

Any suitable method of making the resins may be used. When it is inconvenient to add decolorizing agent during the polymerization process, the solution or melt addition methods can be used to decolorize the resins as illustrated in Examples which follow.

EXAMPLE 3

Addition to Resin Solution

A series of terpene resins and related hydrocarbon resins were prepared from hydrocarbon, terpene, and mixed hydrocarbon-terpene monomer feeds by cationic polymerization methods as described in various patents. In all of the methods, the polymerization product was in solution in organic solvent. After the polymerization and washing steps, each resin solution was divided in half. Work-up of each half was identical except in one the decolorizing agent was added to the resin solution before removal of the solvent by distillation. The final temperature of the molten resin at the end of the distillation was about 240° C. In Table 1, the monomer feed composition, a reference to a detailed description of the resin preparation method, and the product color results are tabulated.

TABLE 1

| Monomer Feed | Resin Solution Preparation Method | Example No. | Yield | Resin Softening Point °C. | Iodine Used %* | Gardner Color (1963) | APHA*** Color |
|---|---|---|---|---|---|---|---|
| Beta-Pinene | 3,737,418 | 3a | 97 | 114 | — | 3+ | — |
|  | Ex. 1 | 3b | 97 | 113 | .02 | 1— | 70 |
| Limonene | 3,761,457 | 3c | 98 | 104 | — | 3 | 50 |
| 70% by wt., Styrene 30% by wt., | Ex. 1 | 3d | 99 | 104 | .02 | 1— |  |
| Limonene | 3,737,418 | 3e | 97 | 113 | — | 4 | 65 |
|  | Ex. 1 | 3f | 96 | 115 | .01 | 1— |  |
| Piperylene** | 4,098,982 | 3g | 93 | 95 | — | 5 | — |
| 60% by wt., Limonene 30% by wt., Styrene 10% by wt. | Ex. 1 | 3h | 94 | 95 | .03 | 2 | — |
| Piperylene | Ex. 2 herein | 3i | — | — | — | 3 |  |
|  |  | 3j | — | — | 0.02 | 2 |  |
| Piperylene 75% by wt., Vinylcyclohexane | Ex. 2 herein | 3k | — | — | — | 4+ |  |
|  |  | 3l | — | — | .02 | 3 |  |

TABLE 1-continued

| Monomer Feed | Resin Solution Preparation Method | Example No. | Yield | Resin Softening Point °C. | Iodine Used %* | Gardner Color (1963) | APHA*** Color |
|---|---|---|---|---|---|---|---|
| 25% by wt. | | | | | | | |

*Based on resin solids
**Freshly distilled
***ASTM D 1209

EXAMPLE 4

Addition to Molten Resins

Samples of molten resin product from parts 3a, 3c and 3e of Example 3 were carefully split in half and were maintained at 230° C. One half of each was treated with iodine as shown in Table 2. Colors were determined after ½ hour at this temperature.

TABLE 2

| Sample | | Iodine added %* | Gardner Color (1963) | |
|---|---|---|---|---|
| | | | Initial | After 30 min. |
| (3a) | Beta-Pinene Resin | 0 | 3 | 3 |
| | | .02 | 3 | 1− |
| (3c) | Limonene/Styrene Resin | 0 | 3 | 3 |
| | | .02 | 3 | 1− |
| (3e) | Limonene Resin | 0 | 4 | 4 |
| | | .02 | 4 | 1− |

*based on resin weight

EXAMPLE 5

Addition of Inorganic Iodides

Iodine compounds were used instead of $I_2$ as decolorizing agents with the results shown in Table 3. The iodine compounds were added to beta-pinene resin solutions which contained 100 parts by wt. resin and 80 parts mixed xylene solvent. After the catalyst was added the solvent was removed under a nitrogen atmosphere by heating to 240° C. This temperature was maintained for ½ hr. and then a 100 mm Hg vacuum was applied for 10 min. at 240° C. to remove volatiles.

TABLE 3

| Decolorizing Agent | Iodine Concentration, wt %, Based on Resin | Gardner Color (1963) | |
|---|---|---|---|
| | | No Agent | With agent |
| $I_2$ | 0.02 | 3 | 1 |
| $NH_4I$ | 0.06 | 3 | 1 |
| KI | 0.06 | 3 | 1 |
| $Br_2$ | 0.02 | 3 | 2 RWS |
| $KIO_3$ | 0.04 | 4 | 1 |
| $(nC_4H_9)_4NI$ | 0.06 | 4 | 1 |
| $FeI_2$ | 0.03 | 1 | 1 |

TABLE 3-continued

| Decolorizing Agent | Iodine Concentration, wt %, Based on Resin | Gardner Color (1963) | |
|---|---|---|---|
| | | No Agent | With agent |
| $FeI_2$ | 0.03 | 2 | 1 |
| HI (57%) | 0.03 | 2 | 1 |
| $CHI_3$ | 0.03 | 2 | 1 |
| ICl | 0.025 | 2 | 1 |
| $HIO_3$ | 0.03 | 2 | 1 |

EXAMPLE 6

Irradiation with UV light of a beta-pinene resin solution at 150° C. containing 0.02% $I_2$ bleached the resin solution from a 4 to a 1 in 1 hour.

EXAMPLE 7

A beta-pinene resin was prepared using 2.5% by wt. $AlCl_3$ and 0.02% $AlI_3$ by the method of Example 2. The Gardner color of the product was 1.

We claim:

1. A method of decolorizing resins of polymerized monomers consisting of $C_5$–$C_{10}$ hydrocarbons having one or two ethylenic double bonds which comprises adding a decolorizing agent selected from iodine, and its compounds during or after polymerization, the amount of decolorizing agent being sufficient to decolorize the resin at elevated temperature in the range from about 130° to 240° C. or with ultraviolet radiation to Gardner Color of 1 or less.

2. A method defined by claim 1 wherein the defined decolorizing agent is added to a polymerization reaction mixture of monomers prior to or during the polymerization, or to a solution of the polymeric resin or to a melt of the resin.

3. A method defined by claim 1 wherein the defined resin consists of polymerized terpene monomers or of copolymerized terpene and non-terpene $C_5$–$C_{10}$ monomeric hydrocarbons.

4. A method defined by claim 1 wherein the defined resin consists of polymerized $C_5$ to $C_{10}$ non-terpene hydrocarbon monomers.

5. A method defined by claim 1 wherein the decolorizing agent is used at the level of 0.005 to 0.2% by wt. based on the monomer or resin weight, of iodine or of iodine combined in a compound.

* * * * *